(12) United States Patent
Brilmyer et al.

(10) Patent No.: US 8,859,129 B2
(45) Date of Patent: *Oct. 14, 2014

(54) SMART BATTERY SEPARATORS

(71) Applicants: George H Brilmyer, Johnson City, TN (US); Robert A. Wimberly, Milligan College, TN (US)

(72) Inventors: George H Brilmyer, Johnson City, TN (US); Robert A. Wimberly, Milligan College, TN (US)

(73) Assignee: MP Assets Corporation, Piney Flats, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/750,326

(22) Filed: Jan. 25, 2013

(65) Prior Publication Data

US 2013/0136957 A1 May 30, 2013

Related U.S. Application Data

(62) Division of application No. 12/500,279, filed on Jul. 9, 2009, now Pat. No. 8,389,149.

(51) Int. Cl.
*H01M 2/14* (2006.01)
*H01M 2/18* (2006.01)
*H01M 2/16* (2006.01)

(52) U.S. Cl.
CPC .............. *H01M 2/18* (2013.01); *H01M 2/1646* (2013.01); *H01M 2/166* (2013.01); *H01M 2/1653* (2013.01); *H01M 2/162* (2013.01); *Y02E 60/12* (2013.01); *H01M 2/1613* (2013.01)
USPC ............ 429/129; 429/247; 429/248; 429/249

(58) Field of Classification Search
USPC .................................. 429/129, 247, 248, 249
See application file for complete search history.

(56) References Cited

U.S. PATENT DOCUMENTS

| | | | |
|---|---|---|---|
| 3,862,861 A | | 1/1975 | McClelland et al. |
| 4,699,857 A | * | 10/1987 | Giovannoni et al. ......... 429/204 |
| 5,248,428 A | * | 9/1993 | Hagen et al. .................. 210/656 |
| 5,629,364 A | | 5/1997 | Maimbom et al. |
| 5,720,780 A | | 2/1998 | Liu et al. |
| 5,744,509 A | | 4/1998 | Wilson et al. |
| 5,904,978 A | | 5/1999 | Hanrahan et al. |
| 6,242,127 B1 | | 6/2001 | Paik et al. |
| 6,824,925 B2 | | 11/2004 | Muraoka et al. |
| 2006/0172198 A1 | | 8/2006 | Kakizaki et al. |
| 2008/0113259 A1 | | 5/2008 | Brilmyer et al. |

FOREIGN PATENT DOCUMENTS

JP          1339750 A    12/1999

* cited by examiner

*Primary Examiner* — Jane Rhee
(74) *Attorney, Agent, or Firm* — Luedeka Neely Group, PC

(57) ABSTRACT

A separator for an energy storage cell that is provided by a microporous web that includes an irreversible porosity-controlling agent a method for changing an operating characteristic of an energy storage cell.

12 Claims, 3 Drawing Sheets

SMART BATTERY SEPARATORS

CROSS REFERENCE TO RELATED APPLICATIONS

This application claims priority to and is a division of U.S. application Ser. No. 12/500,279, filed Jul. 9, 2009, now allowed.

TECHNICAL FIELD

The disclosure relates to improved energy storage cell separators, and in particular to microporous separators for use in energy storage cells which have characteristics that enable enhanced performance under variable operating conditions.

BACKGROUND AND SUMMARY

In the late 1970s, a no water addition lead-acid battery was developed that unlike its predecessor, the Gel battery, used a unique very absorbent separator to hold the battery acid like a sponge. The separator for such an energy storage cell is an absorbent glass mat (AGM) which is a non-woven separator made from spun-glass microfibers. The AGM separator is typically operated in a partially saturated state where acid is absorbed by the separator but the total porosity of the separator is not completely filled with acid. A rechargeable lead-acid energy storage cell containing the AGM separator operates on the principle of oxygen recombination whereby oxygen generated at the positive plate diffuses through the partially saturated AGM separator and is therefore able to be chemically reduced at the surface of the negative electrode to be re-formed back into water. To better facilitate the oxygen recombination reaction and reduce overall water-loss, the energy storage cell also incorporates a pressure relief valve that maintains a low head-pressure (typically from about 1-5 psi) in the cell.

Accordingly oxygen recombination is used to eliminate water addition during the life of the energy storage cell. Because the AGM energy storage cells do not "gas freely" they may also be known as valve regulated lead-acid (VRLA) batteries using AGM technology. As stated above, an AGM separator is a non-woven micro-glass mat separator that is soft, compressible, and very absorbent. In a manner similar to a disposable baby diaper, the AGM separator absorbs and holds the acid. The separator is 92-96% porous and actually absorbs 7-8 times its weight in acid. The AGM energy storage cell is designed so that the thickness of the plates and the AGM separators fit into the cell case very tightly. In fact, most AGM energy storage cells are designed in such a way that the AGM separators are ultimately compressed 20-30% of their uncompressed volume when stuffed into the cell case. Compression of the AGM separator gives the cell the needed plate-to-separator interfacial contact and makes the energy storage cell substantially vibration resistant. The highly porous nature of AGM separators leads to lower internal cell resistance and better high rate performance of the energy storage cell.

In most if not all cases, an AGM energy storage cell is a deep cycle battery that can be used in UPS systems, wheel chairs, portable tools, consumer electronics, alarms, boats, heavy equipment and some toys. Other applications may include emergency lighting, telecommunications equipment, backup power systems and solar powered battery systems.

A problem with AGM energy storage cells is that as the cell ages, the cell loses water and the separator dries out. As the separator dries out, the oxygen recombination rate increases and energy storage cell runs hotter. Under certain conditions, the oxygen recombination in the AGM energy storage cell may become too vigorous causing the energy storage cell to go into thermal runaway. If the charger used for charging the energy storage cell is not temperature compensated, the energy storage cell may eventually melt and, in severe cases, ignite or burn.

Despite the advances made in the art with respect to separators for energy storage cells, there continues to be a need for separators for energy storage cells which exhibit improved physical and electrochemical properties over conventional separators. For example, there is a need for attenuating the oxygen recombination process in an AGM energy storage cell as the cell ages in order to prevent thermal runaway and/or damage to the energy storage cell.

With regard to the above, one embodiment of the disclosure provides a separator for an energy storage cell that is provided by a microporous web that includes an irreversible porosity-controlling agent Another embodiment provides a method for changing an operating characteristic of an energy storage cell. The method includes applying from about 5 to about 50 weight percent of an irreversible porosity controlling agent to a separator material. An improved separator may be formed from the separator materials and the irreversible porosity-controlling agent. The porosity-controlling agent may be selected from agents that change size as a function of temperature, agents that change size as a function of pH, agents that change size as a function of pressure, and agents that change size as a function of temperature, pH, and/or pressure. The energy storage cell is then operated with the separator.

The separators according to the invention exhibit improved properties as compared to conventional separators. Another advantage of the disclosed embodiments is that the separators may take an active rather than passive role in improving the performance of energy storage cells under variable conditions. Until now, energy storage cell separators have been a passive component of the cells, with the exception of the tri-layer thermal shutdown separator used in the lithium-ion battery industry (see U.S. Pat. No. 5,952,120 and others assigned to Celgard). The "shutdown" separator is a three-layer structure of stretched polypropylene/polyethylene/polypropylene. The internal layer of PE is designed to melt at high temperatures thus increasing the electrical resistance of the storage cell and "shutting down" the energy storage cell. The process of "shutting down" the energy storage cell is irreversible and once this occurs the energy storage cell is non-functional and must be replaced. By comparison, the separators described herein may be used to attenuate the electrical resistance of the separator as the temperature of the energy storage cell rises thereby enabling continued use of the storage cell even as the cell ages and the separator dries out.

BRIEF DESCRIPTION OF THE DRAWINGS

Further advantages of the exemplary embodiments may become apparent by reference to the detailed description of the exemplary embodiments when considered in conjunction with the following drawing illustrating one or more non-limiting aspects of thereof.

DESCRIPTION OF THE EXEMPLARY EMBODIMENT

Separators as described herein may be made of a wide variety of materials including natural and synthetic rubbers, polyolefins, non-woven glass fibers, and the like. Particularly suitable materials for AGM separators according to the disclosure are non-woven glass fibers, and non-woven polyolefin separators.

One component of a separator according to the disclosure is a particulate filler. The particulate filler may be selected from carbon black, diatomaceous earth and silica particles. A suitable source of silica particles is precipitated silica, available from PPG Industries, Inc. of Pittsburgh, Pa., Rhodia Silica Systems of Lyon, France, and Evonik-Degussa GmbH of Dusseldorf, Germany.

Separators made of such as non-woven fiber separators may benefit from the inclusion of irreversible porosity-controlling agent as described below.

Suitable porosity-controlling agents that may be used according to exemplary embodiment of the disclosure may be selected from agents that expand in response to rising temperatures and contract in response to pressure. Other porosity-controlling agents that may be used may expand upon an increase in electrolyte pH or a decrease in pressure. Still other porosity-controlling agents may expand in response to a combination of one or more of temperature, pressure, and electrolyte pH Accordingly, the porosity-controlling agents are used in an amount sufficient to affect the porosity of the separator as the separator ages. For example, as the temperature of the energy storage cell increases, the porosity-controlling agent expands and the separator porosity decreases.

Preparation of expandable particulate that may be used as a porosity-controlling agent in an AGM energy storage cell is normally accomplished by suspension polymerization. A general description of some of the techniques that may be employed and a detailed description of various compositions that may useful as expandable particulate may be found in U.S. Pat. No. 3,615,972. A further description of compositions useful as expandable particulate in embodiments of the disclosure may be found in U.S. Pat. No. 4,483,889. Both patents are incorporated herein by reference.

Examples of commercially available expandable hollow polymeric microspheres useful in the disclosed embodiments include those made of poly(vinylidene chloride-co-acrylonitrile) such as the polymeric microspheres available from Akzo Nobel, Sweden under the trade name EXPANCEL. Other commercially available materials having similar constructions, and comprising, for example, a shell of methacrylonitrile-acrylonitrile copolymer, available from Matsumoto Yushi-Seiyaku Co., Ltd, Japan under the trade name MICROPEARL microbubbles, are also useful as expandable particulate in the present invention.

Figure 1:
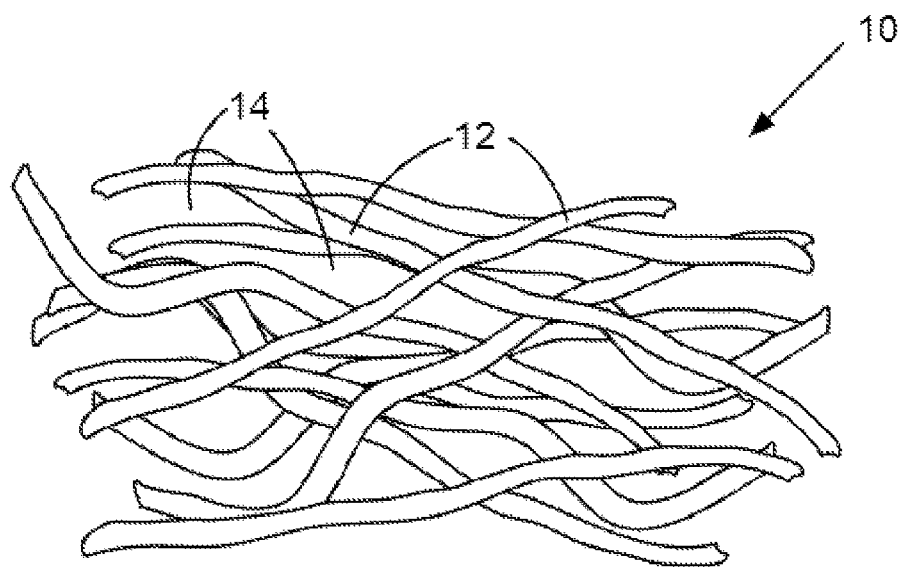
FIG. 1 is a schematic cross-sectional representation of a prior art separator.
Figure 2:
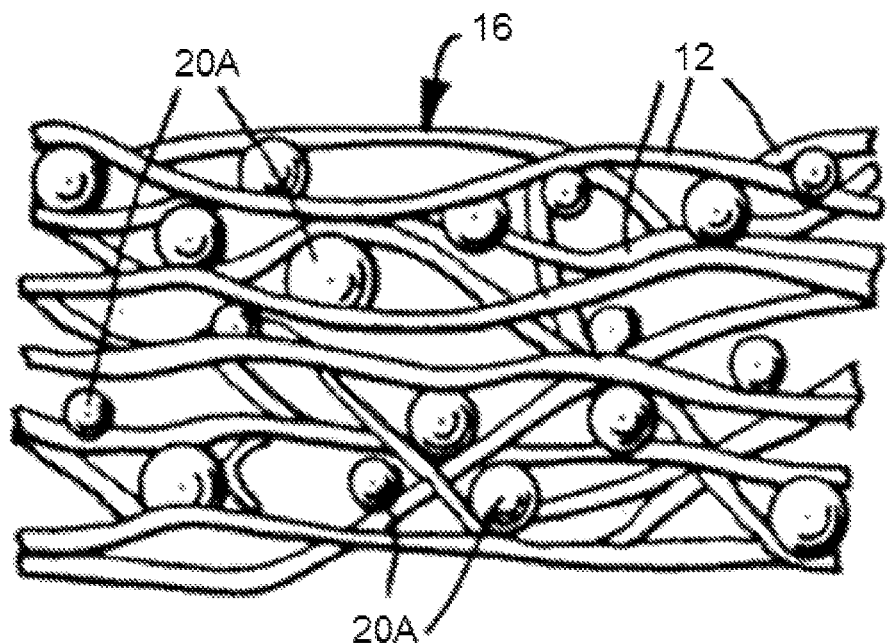
FIG. 2 is a schematic cross-sectional representation of a separator including a porosity controlling agent at a first operating condition.
Figure 3:
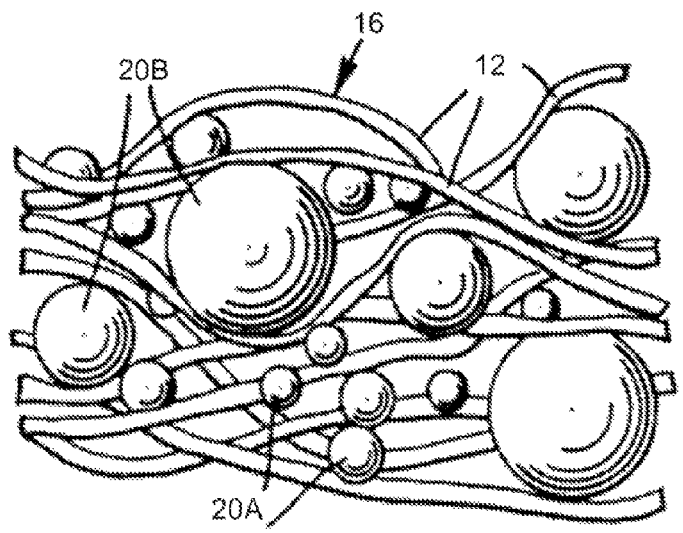
FIG. 3 is a schematic cross-sectional representation of a separator including a porosity controlling agent at a second operating condition.

The porosity of a separator may be better understood by referring to FIGS. 1-3. FIG. 1 is a schematic representation of a portion of a prior art separator 10. The separator 10 may include non-woven fibers 12 that are bonded to one another in a conventional web making process. For example, glass fiber separators and polyolefin fiber separators have been produced commercially by wet processes on paper making equipment including fourdrinier machines and rotoformers, inclined fourdrinier machines and extended wire rotoformers. In the production of separator made of glass fibers for VRLA batteries, it is preferred that no organic binder be added to a furnish from which separator sheets are made; the entanglement of individual micro-glass fibers serves to maintain the sheet in a cohesive structure, and water glass or any of various sulfate salts, which sometimes form on the fiber surfaces, serves as a binder. Organic binders, however, tend to decrease the ability of a separator to wick acid, and to decrease the amount of acid a separator can hold. Dry processes for making fibrous energy storage cell separators may also be used as disclosed in U.S. Pat. No. 6,306,539. Void spaces 14 between the fibers 12 provide up to about 95 percent porosity of the separator 10.

Embodiments of the disclosure may also be applicable to other types of energy storage cell separators other than fibrous separators. For example, porosity controlling particles as described herein may also be incorporated in flexible natural rubber separators such as the separators made according to U.S. Pat. No. 4,213,815.

In FIGS. 2 and 3, porosity controlling particles 20 are included in a fibrous separator 16. The porosity controlling particles 20 may have a first size indicated by the particles 20A in FIG. 2, and a second size indicated by the particles 20B in FIG. 3. In FIG. 2, the particles 20A may be in an unexpanded or contracted state thereby enabling the separator 16 to have a first porosity that is similar to the porosity of the separator 10 in FIG. 1. In FIG. 3, the particles 20B are in expanded state thereby decreasing the porosity of the separator 16. Accordingly, the porosity of the separator in FIG. 3 is less than the porosity of the separators in FIGS. 1 and 2.

The porosity controlling particles included in the separator 16 may be selected from particles that change size in response to temperature, pH, pressure, or a combination of two or more of temperature, pH, and pressure. By selecting a porosity-controlling agent that expands as the temperature of the energy storage cell increase, the porosity of the separator 16 may be decreased as illustrated by expansion of particles 20A in FIG. 2 to the particles 20B in FIG. 3. As the porosity of the separator 16 is decreased, the electrical resistance of the separator 16 is increased thereby reducing the rate of oxygen recombination which may layer the operating temperature of the energy storage cell.

The following non-limiting examples are provided to further illustrate one or more aspects of the exemplary embodiments.

Example 1

In the following example, AGM separators were made by tearing 3.4 grams AGM sheets (~4.5"×4.5") having a density of 300 g/m² into pieces by hand and mixing the torn pieces into 800 ml of cold water for 24 hours. A magnetic stirring was used to stir the mixture and to produce a slurry. EXPANCEL microspheres (0.051 grams, 15 wt. %) were then were added to the cold water and AGM pieces and the mixture was stirred for ~1 hour. The resulting mixture was poured into a ~4" diameter vacuum filter funnel to form a new AGM sheet. The AGM sheet was vacuum dewatered. The resulting 4" round EXPANCEL loaded AGM sheet was then removed from the filter funnel, placed between sheets of paper towel and blotted dry. Each sheet was then permitted to dry in air for 48 hours. A control sample AGM sheet was also made by this method but without the addition of EXPANCEL microspheres.

A ceramic hot plate was adjusted to the approximate temperature. A stack of five pieces of 5"×5"×0.25" safety glass was then placed onto the hot plate and permitted to thermally equilibrate. A laser temperature gun was then used to determine the temperature of the hot plate beneath the stack of glass plates. When the temperature was properly adjusted the AGM sample was quickly placed beneath the stack of glass plates and a digital timer started. All AGM samples were heat-treated by this method for 3 minutes. At the end of 3 minutes the samples were quickly removed. It was noted that at 133° C. and 150° C. that the samples became noticeably thicker as the EXPANCEL microspheres expanded.

Electrical resistance for each of the separator webs was determined before and after heating the separator webs. The results are shown in Table 1. In the table, "T-Start" is the temperature as which swelling of the EXPANCEL material begins, and "T-Max" is the temperature at which the EXPANCEL material reaches its maximum size. In the table AGM EX-1 included 15 wt. % of EXPANCEL 051 DU 40 microspheres added to the glass fibers prior to forming the separator. AGM EX-2 included 15 wt. % of EXPANCEL 920 DU 40 microspheres added to the glass fibers before forming the separator. The control samples contained no microspheres.

TABLE 1

| | EXPANCEL | EXPANCEL | Electrical Resistance (milli-ohm-cm$^2$) | | | |
| | | | | Heated (3 min) | | |
| | T-Start (° C.) | T-Max (° C.) | Unheated | 75° C. | 130° C. | 150° C. |
| --- | --- | --- | --- | --- | --- | --- |
| AGM Control | | | 215 | — | — | 204 |
| AGM EX-1 | 110 | 145 | 180 | 413 | 1,116 | 793 |
| AGM EX-2 | 135 | 175 | 310 | 471 | 1,374 | 1,561 |

As shown by the foregoing examples, heating the separators containing the porosity controlling agents (AGM EX-1 and AGM EX-2) provided a substantial increase in electrical resistance over the AGM control samples. The samples containing EX-2 microspheres as compared to the samples containing EX-1 microspheres had about a 14% increase in the electrical resistance of the separator when the separated was heated for 3 minutes to 75° C. while it provided about a 23% increase at 130° C. and about a 97% increase at to 150° C.

Example 2

Figure 4:
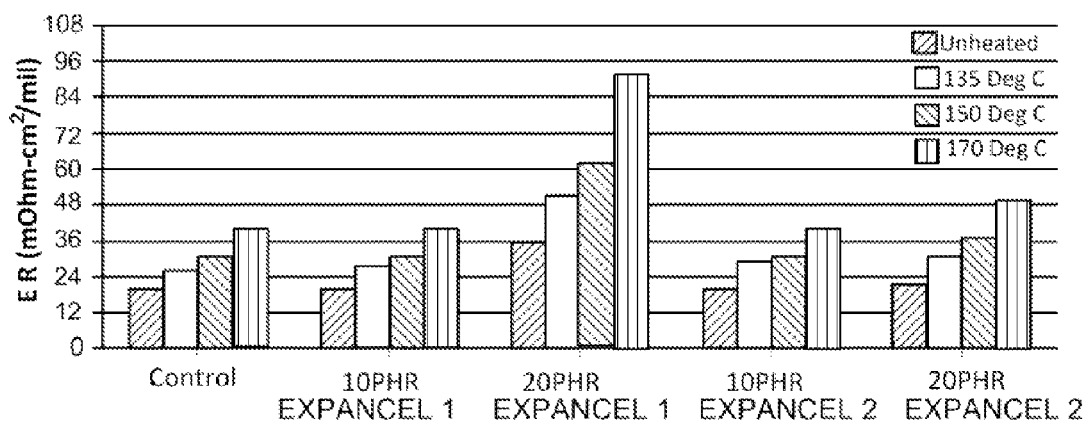
FIG. 4 is a graphical illustration of electrical resistances of separators containing porosity controlling agents before and after heating the separators.

In the following example, flexible rubber separators were made with and without the porosity controlling agents described above. Two different EXPANCEL products were used in this example EX-1 and EX-2 as described above. Each of the products was added to the flexible rubber separator during compounding of the rubber for the separator at the rate of 10 and 20 pounds per hundred pounds of rubber. Electrical resistances (milli-ohms-cm$^2$) of a control example and the separators containing the porosity controlling agents upon heating for two minutes are given in the following table. In FIG. 4, the separators were heated at the indicated temperatures for two minutes.

Figure 5:
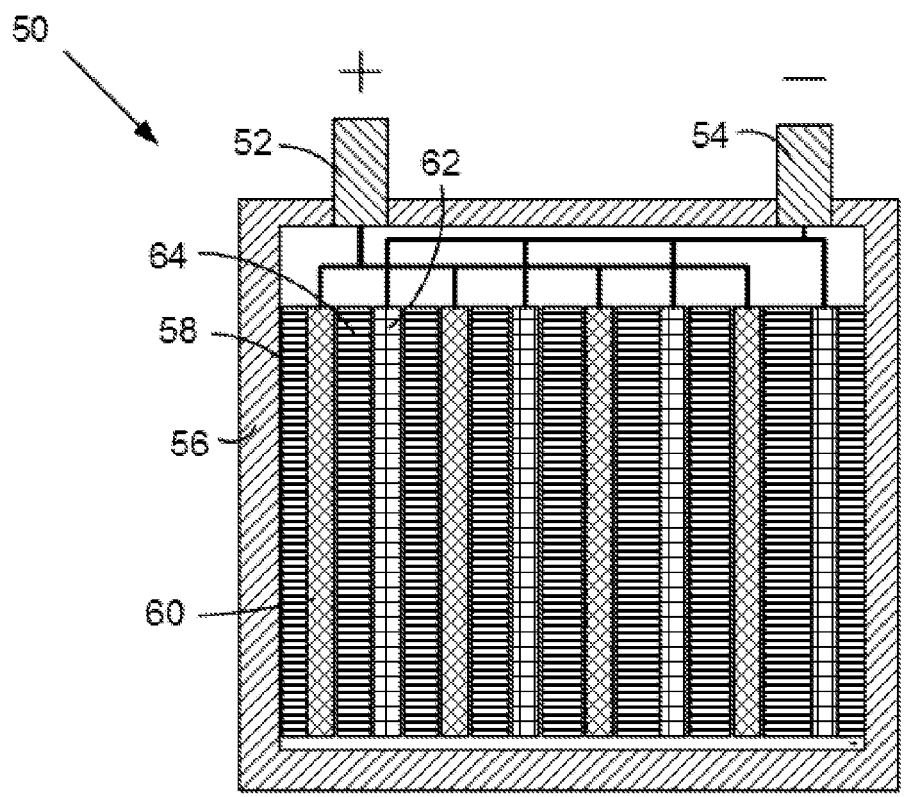
FIG. 5 is a schematic cross-sectional representation of an energy storage cell containing a separator according to embodiments of the disclosure.

In the foregoing examples, there was a slight increase in electrical resistance between the control sample and the EXPANCEL 2 sample upon heating for two minutes and containing 10 to 20 phr in the rubber. However, there was a dramatic increase in the electrical resistance for the EXPANCEL 1 samples at 20 phr after heating at two minutes. Accordingly, it is believed that a combination of two or more types of porosity-controlling agents may be added to a separator to provide an increase in electrical resistance at a desired temperature. In other words, a separator may be optimized for operation at a desired electrical resistance for a particular operating temperature by using different porosity controlling agents at different loadings in the separator. Hence, as an example, a flexible rubber separator may contain 10 phr of EXPANCEL 1 and 10 phr of EXPANCEL 2 to obtain an electrical resistance that is greater than 27.6 and less than 93.8 milli-ohm-cm$^2$/mil The foregoing separators may be used in an AGM energy storage cell as illustrated in FIG. 5. FIG. 5 is a schematic cross-sectional view of an energy storage cell 50 according to embodiments of the disclosure. The cell 50 includes positive and negative terminals 52 and 54 extending through a case 56. The case 56 encloses positive and negative electrodes 60 and 62 and separators 64 between adjacent electrodes 60 and 62. An electrolyte for the energy storage cell is absorbed within the separators 64. The separators 64 may include one or more of the porosity controlling agents described above to increase or decrease the electrical resistance between the electrodes 60 and 62 by reversibly increasing or decreasing the porosity through the separator 64.

At numerous places throughout this specification, reference has been made to a number of U.S. Patents and publications. All such cited documents are expressly incorporated in full into this disclosure as if fully set forth herein.

The foregoing embodiments are susceptible to considerable variation in its practice. Accordingly, the embodiments are not intended to be limited to the specific exemplifications set forth hereinabove. Rather, the foregoing embodiments are within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part hereof under the doctrine of equivalents.

TABLE 2

| Temperature | Control (no EXPANCEL 1) | EXPANCEL 1 10 PHR | EXPANCEL 1 20 PHR | EXPANCEL 2 10 PHR | EXPANCEL 2 20 PHR |
| --- | --- | --- | --- | --- | --- |
| Unheated | 21.1 | 22.8 | 36.1 | 21.1 | 23.3 |
| 135° C. | 25.5 | 27.6 | 51.8 | 27.0 | 31.3 |
| 150° C. | 29.1 | 29.4 | 62.8 | 29.2 | 36.7 |
| 170° C. | 40.6 | 41.8 | 93.8 | 39.7 | 48.6 |

What is claimed is:

1. A separator for a lead acid battery comprising a microporous web configured for disposing between positive and negative electrodes in the battery, wherein the web is a non-woven fibrous matrix and is characterized by containing an irreversible porosity-controlling agent selected from the group consisting of microspheres derived from poly(vinylidene chloride-co-acrylonitrile) materials or methacrylonitrile-acrylonitrile materials, and wherein the porosity-controlling agent is effective to irreversibly decrease the porosity of the separator and increase the electrical resistance between the positive and negative electrodes as the battery ages.

2. The separator of claim 1, wherein the microporous web comprises a non-woven glass fiber matrix.

3. The separator of claim 1, wherein the microporous web comprises a web made from a mixture of polyolefin fibers or glass-fibers and silica.

4. A lead acid battery comprising the separator of claim 1, wherein the lead acid battery is selected from primary and secondary lead acid batteries.

5. The separator of claim 1, wherein the porosity-controlling agent is selected from the group consisting of agents that change size as a function of temperature, pH, and/or pressure to provide a change in an overall porosity of the separator.

6. The separator of claim 1, wherein the microspheres comprise fluid-filled microspheres.

7. The separator of claim 6, wherein the separator comprises from about 5 to about 50 percent by weight of the fluid-filled microspheres.

8. The separator of claim 1, wherein the non-woven fibrous matrix comprises a glass mat fibrous matrix.

9. The separator of claim 1, wherein the non-woven fibrous matrix comprises a polyolefin fibrous matrix.

10. A method for changing an operating characteristic of a lead acid battery during battery operation as the battery ages, characterized by:
    applying from about 5 to about 50 weight percent of an irreversible porosity controlling agent to a separator material;
    forming a separator from the separator material and porosity-controlling agent,
    disposing the separator between positive and negative electrodes in the battery; and
    operating the lead acid battery with the separator,
    wherein the porosity-controlling agent is selected from the group consisting of microspheres derived from poly(vinylidene chloride-co-acrylonitrile) materials or methacrylonitrile-acrylonitrile materials, and wherein the porosity-controlling agent is effective to irreversibly decrease the porosity of the separator and increase the electrical resistance between the positive and negative electrodes as the battery ages.

11. The method of claim 10 wherein the energy storage cell is selected from the group consisting of primary and secondary batteries.

12. The method of claim 10, wherein the porosity controlling agent is selected from the group consisting of agents that change size as a function of temperature, pH, and/or pressure to provide a change in an overall porosity of the separator.

* * * * *